United States Patent [19]
Byford

[11] Patent Number: 6,097,375
[45] Date of Patent: *Aug. 1, 2000

[54] SYSTEM, METHOD, AND POINTING DEVICE FOR REMOTE OPERATION OF DATA PROCESSING APPARATUS

[75] Inventor: Derrick John Byford, London, United Kingdom

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/864,142

[22] Filed: May 28, 1997

[30] Foreign Application Priority Data

Dec. 13, 1996 [GB] United Kingdom .................... 9625965

[51] Int. Cl.[7] ................................. G09G 5/08; G09G 5/00
[52] U.S. Cl. ............................................. 345/169; 345/158
[58] Field of Search ..................................... 345/156, 158, 345/169, 173; 379/354, 355, 356; 348/552, 601, 734

[56] References Cited

U.S. PATENT DOCUMENTS

| 5,339,095 | 8/1994 | Redford | 345/158 |
|---|---|---|---|
| 5,440,627 | 8/1995 | Puri | 379/354 |
| 5,455,858 | 10/1995 | Lin | 379/355 |
| 5,457,738 | 10/1995 | Sylvan | 379/354 |
| 5,502,459 | 3/1996 | Marshall et al. | 345/158 |
| 5,522,089 | 5/1996 | Kikinis et al. | 345/173 |
| 5,624,265 | 4/1997 | Redford et al. | 345/158 |
| 5,627,564 | 5/1997 | Yang | 345/158 |
| 5,724,106 | 3/1998 | Autry et al. | 345/158 |

FOREIGN PATENT DOCUMENTS 2 195 849   4/1988   United Kingdom .

OTHER PUBLICATIONS

Douglas C McArthur, 'World Wide Web & HTML', pp. 18–26, Dr Dobb's Journal, Dec. 1994.

*Primary Examiner*—Vijay Shankar
*Attorney, Agent, or Firm*—David A. Mims, Jr.

[57] ABSTRACT

A pointing device having a sensor for directing towards an icon displayed on a display screen. The sensor generates a sense signal indicative of an attribute of the icon. An audio generator generates, in dependence on the sense signal, an audio signal for subsequent detection by the microphone of a telephone. Also, a system includes the pointing device, for remote selection of one or more options in a data processing apparatus. The system is capable of receiving a call from a telephone; allocating a teletext page in a television signal in response to the call; associating each option with an icon; writing each icon to the allocated teletext page; associating each icon with an audio signal; and, activating each option on receipt of the corresponding audio signal from the telephone.

11 Claims, 5 Drawing Sheets

SYSTEM, METHOD, AND POINTING DEVICE FOR REMOTE OPERATION OF DATA PROCESSING APPARATUS

BACKGROUND OF THE INVENTION

1. Technical Field

The present invention relates to a system, method, and pointing device for remote operation of data processing apparatus.

2. Description of the Prior Art

In recent years, there has been explosive growth in the Internet, and in particular of the WorldWide Web (WWW), which is one of the facilities provided via the Internet. The WWW comprises many pages or files of information, distributed across many different servers. Each page is identified by an individual address or "Universal Resource Locator (URL)". Each URL denotes both a server machine, and a particular file or page on that machine. There may be many pages or URLs resident on a single server.

Typically, to utilise the WWW, a user runs a computer program called a Web browser on a client computer system such as a personal computer. Examples of widely available Web browsers include the "WebExplorer" Web browser provided by International Business Machines Corporation in the OS/2 Operating System software, or the "Navigator" Web browser available from Netscape Communications Corporation. The user interacts with the Web browser to select a particular URL. The interaction causes the browser to send a request for the page or file identified in selected URL to the server identified in the selected URL. Typically, the server responds to the request by retrieving the requested page, and transmitting the data for that page back to the requesting client. The client-server interaction is usually performed in accordance with a protocol called the hypertext transfer protocol ("http"). The page received by the client is then displayed to the user on a display screen of the client. The client may also cause the server to launch an application, for example to search for WWW pages relating to particular topics.

WWW pages are typically formatted in accordance with a computer programming language known as hypertext mark-up language ("html"). Thus a typical WWW page includes text together with embedded formatting commands, referred to as tags, that can be employed to control for example font style, font size, lay-out etc. The Web browser parses the HTML script in order to display the text in accordance with the specified format. In addition, an html page also contain a reference, in terms of another URL, to a portion of multimedia data such as an image, video segment, or audio file. The Web Browser responds to such a reference by retrieving and displaying or playing the multimedia data. Alternatively, the multimedia data may reside on its own WWW page, without surrounding html text.

Most WWW pages also contain one or more references to other WWW pages, which need not reside on the same server as the original page. Such references may be activated by the user selecting particular locations on the screen, typically by clicking a mouse control button. These references or locations are known as hyperlinks, and are typically flagged by the Web browser in a particular manner. For example, any text associated with a hyperlink may be displayed in a different colour. If a user selects the hyperlinked text, then the referenced page is retrieved and replaces the currently displayed page.

Further information about html and the WWW can be found in "World Wide Web and HTML" by Douglas McArthur, p18–26 in Dr Dobbs Journal, December 1994, and in "The HTML SourceBook" by Ian Graham, John Wiley, New York, 1995.

Conventionally, to access WWW pages via the Internet, a user has needed access to relatively specialised and expensive hardware such a personal computer fitted with a modem communications link and a WWW browser software package. More recently, there have become available a variety of so-called "set-top boxes" each for linking a domestic television receiver to the WWW. Examples of such step top boxes includes the Internet TV Terminal available from Phillips/Magnavox and the WebTV Internet Terminal available from Sony Corporation. A set-top box typically includes a modem communication link connectable to the WWW via a subscriber telephone line and a video output connectable to a domestic television receiver for displaying WWW pages down-loaded from the WWW via the modem link. It would be desirable to enable users to access the Internet access with no, or at most the bare minimum of, additional specialist hardware. It would also be desirable to provide a simple user interface for controlling computer applications delivered to a user via a television receiver. U.S Pat. No. 5,236,199 describes an interactive media system and tele-computing method in which a Discrete Tone, Multiple Frequency (DTMF) key-pad of a domestic telephone is employed as a pointing device for moving a cursor on, and selecting options from, the screen of a domestic television receiver. It would be desirable however to provide a pointing device which is simpler to use for such applications.

SUMMARY OF THE INVENTION

In accordance with the present invention, there is now provided a pointing device comprising: a sensor for directing towards an icon displayed on a display screen, the sensor generating a sense signal indicative of an attribute of the icon; and an audio generator for generating, in dependence on the sense signal, an audio signal for subsequent detection by the microphone of a telephone.

This advantageously provides a pointing device for selecting options displayed on a television screen simply by pointing the device at the or each desired option.

The sensor may generate the sense signal as a function of the shape of the icon. Alternatively, the sensor may generate the sense signal as a function of the colour of the icon.

In preferred embodiments of the present invention, a light source is provided for generating a light beam to produce a targeting spot on the display screen to assist aiming of the pointing device.

Viewing the present invention from another aspect, there is provided a system for remote selection of one or more options in a data processing apparatus the system comprising: means for receiving a call from a telephone; means for allocating a teletext page in a television signal in response to the call; means for associating the or each option with an icon; means for writing the or each icon to the allocated teletext page; means for associating the or each icon with an audio signal; and, means for activating the or each option on receipt of the corresponding audio signal from the telephone.

The system preferably comprises means for sending a message identifying the allocated teletext page to the telephone.

The data processing apparatus may comprise a computer network, in which case the system may comprise means for generating a menu of data files available via the computer network, each data file having a different icon specified in the menu, means for writing the menu to the allocated teletext page; means for receiving the audio signal corresponding to a selected icon from the telephone; and means for writing data from the data file corresponding to the selected icon to the allocated teletext page. The system may further comprise means for generating successive menus of data files in response to successive selections received via the telephone.

Preferably, the system comprises means for releasing the allocated teletext page for re-allocation in response to termination of the telephone call.

The system may comprise means for detecting if a teletext page is available for allocation to an incoming call and, in the event that no teletext pages are available for allocation, for returning the incoming call when a teletext page is released for re-allocation.

It will be appreciated that the system may comprise a pointing device as hereinbefore described.

Viewing the present invention from yet another aspect, there is provided a method for selecting an icon on a display screen, comprising: generating, via a sensor directed towards the icon, a sense signal indicative of an attribute of the icon; and generating, in dependence on the sense signal, an audio signal for subsequent detection by the microphone of a telephone.

Viewing the present invention from a further aspect, there is provided a method for remote selection of one or more options in a data processing apparatus, the method comprising: receiving a call from a telephone; allocating a teletext page in a television signal in response to the call; associating the or each option with an icon; writing the or each icon to the allocated teletext page; associating the or each icon with an audio signal; and, activating the or each option on receipt of the corresponding audio signal from the telephone.

BRIEF DESCRIPTION OF THE DRAWINGS

Preferred embodiments of the present invention will now be described by way of example only with reference to the accompanying drawings, in which.

DETAILED DESCRIPTION OF THE PREFERRED EMBODIMENT

Figure 1:
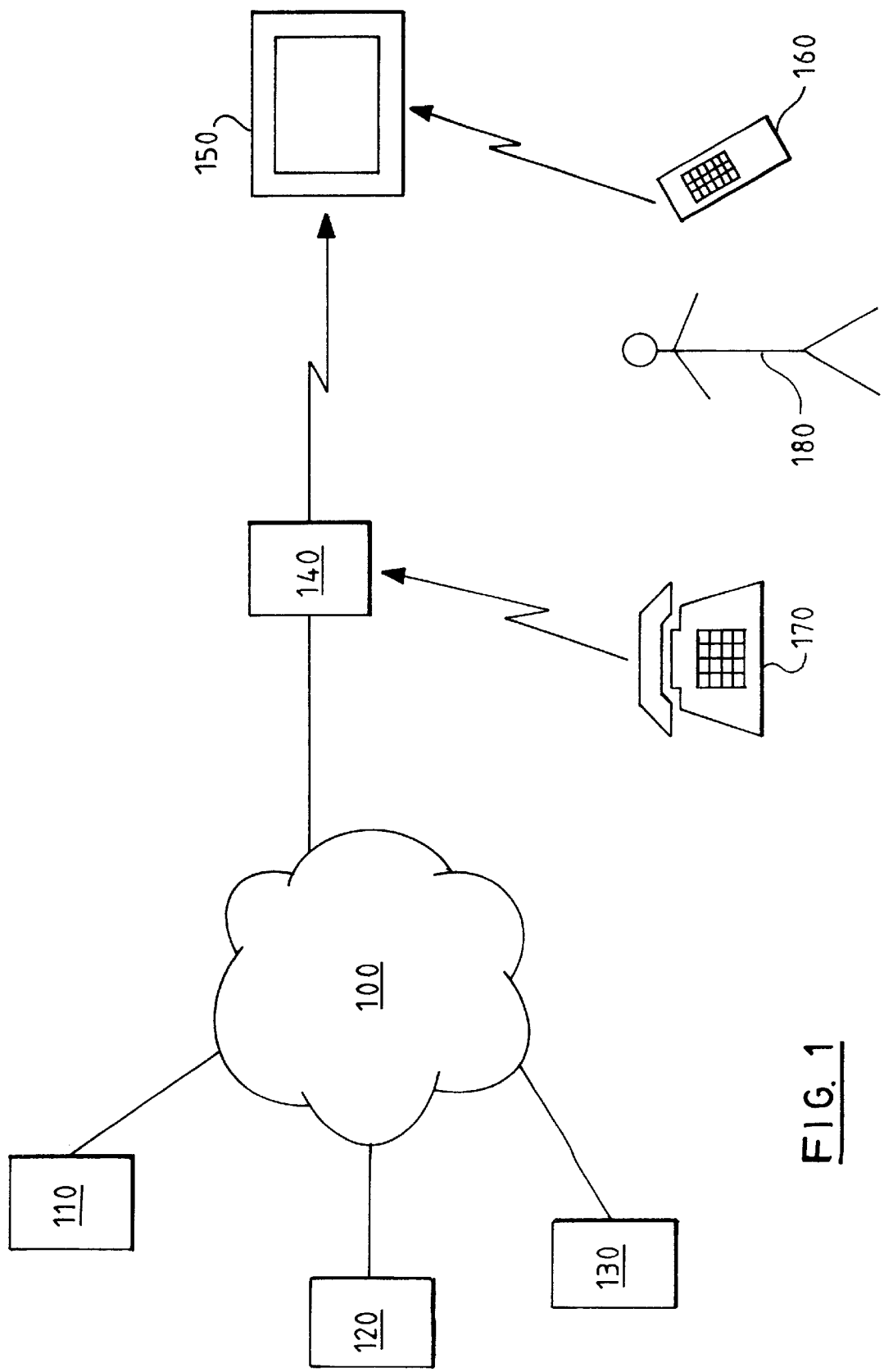
FIG. 1 is a block diagram of a data communications network.

Referring first to FIG. 1, a data communication network embodying the present invention comprises the Internet 100. A plurality of WWW server computer systems 110–130 are connected to Internet 100. Also connected to Internet 140 is a teletext server 140. Teletext server 120 is configured to receive an input from Discrete Tone Multiple Frequency (DTMF) subscriber telephone 170. Teletext server 120 also provides a teletext output to a broadcast television receiver 150 capable of receiving teletext pages. Television receiver 150 can be instructed by user 180 to access different teletext pages via a remote control device 160.

Figure 2:
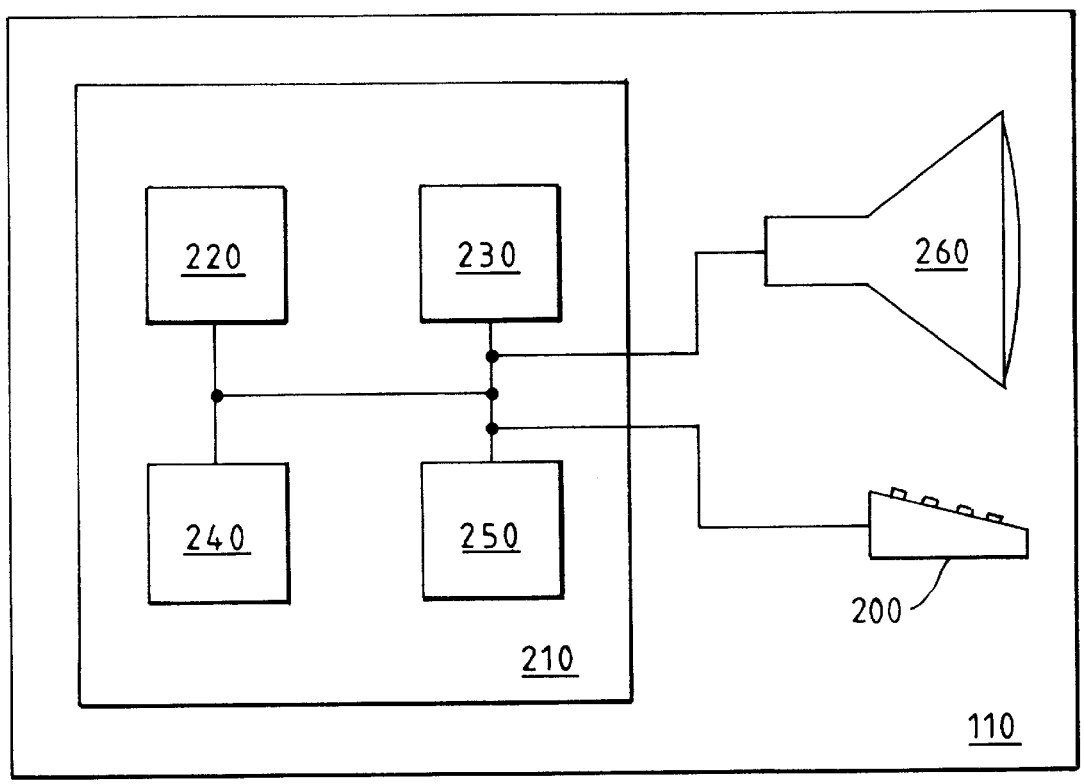
FIG. 2 is a block diagram of a server computer of the data communications network.

Referring now to FIG. 2, each WWW server 110–130 includes a keyboard 200 attached to a system unit 210 including a main CPU 220, system RAM 230, system ROM 240, and mass storage capability 250, typically in the form of multiple magnetic disk drives constituted in a RAID (redundant array of independent disks) arrangement. Each WWW server 110–130 has stored in its mass storage 250 at least one WWW page. Each WWW server 110–130 also includes a display 260 enabling direct interaction between the WWW server 110–130 and an administrator. Each WWW server 110–130 may also include other storage devices such as diskette drives and CD ROM drives. In some embodiments of the present invention, the display 260 and keyboard 200 of each WWW server 110–130 provided via an intermediate personal computer.

Figure 3:
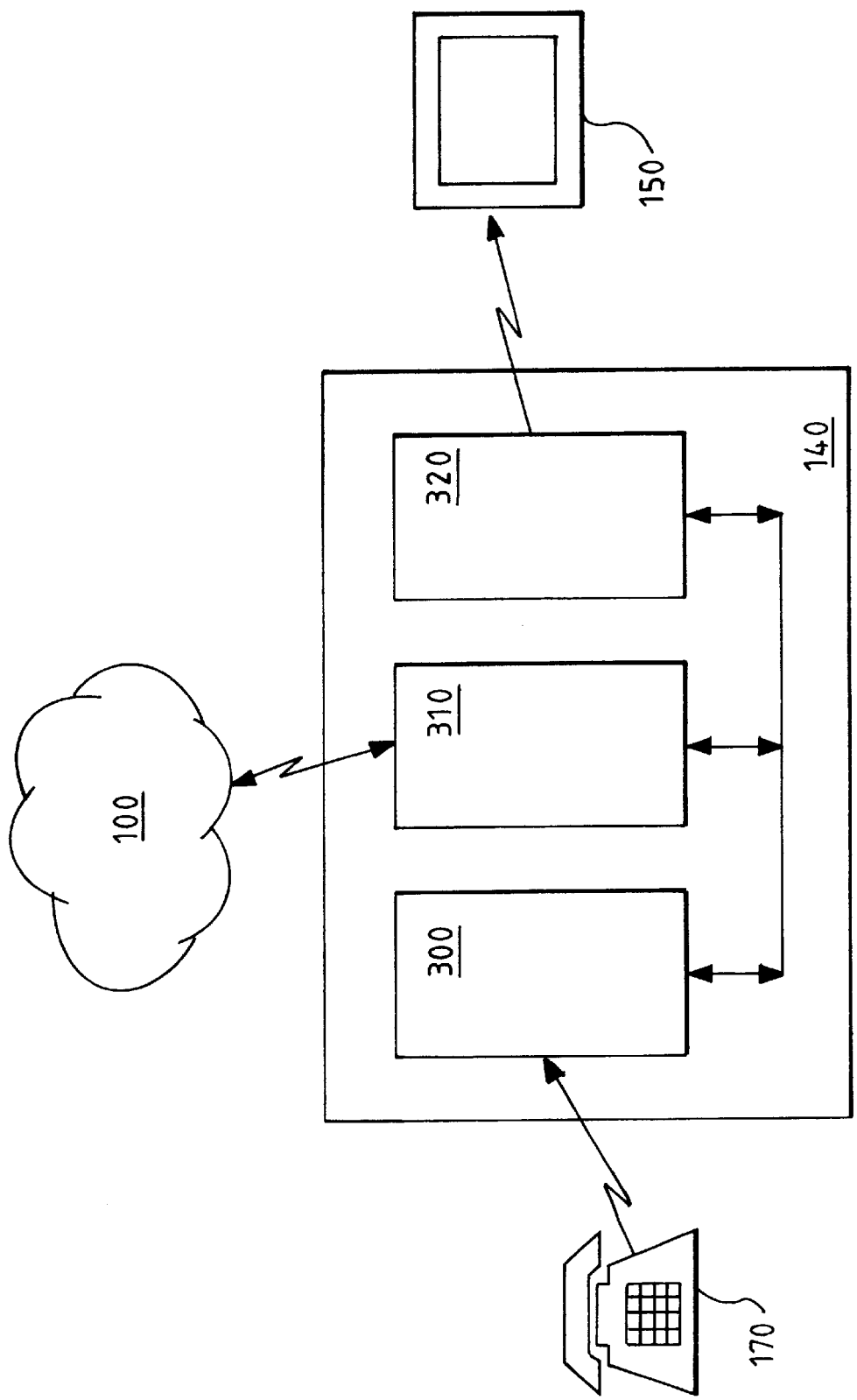
FIG. 3 is a block diagram of a teletext server of the data communications network.

Referring now to FIG. 3, teletext server 140 comprises a telephone call handler 300, a web browser 310, and a WWW page convertor 320 all interconnected to each other. In some embodiments of the present invention, telephone handler 300, web browser 310, and WWW page convertor 320 may be integrated into a single server computer system on the kind hereinbefore described with reference to FIG. 2. However, in other embodiments of the present invention, teletext server 140 may comprise separate computer systems for implementing each of call handler 300, web browser 310, and page convertor 320. Call handler receives incoming telephones calls made to one or more pre-assigned telephone numbers. The pre-assigned telephone numbers may, for example, be premium rate telephone numbers. Web browser 310 is connected to the Internet for accessing WWW pages. WWW page convertor 320 is connected to a teletext input of a broadcast television signal generator (not shown).

Figure 4:
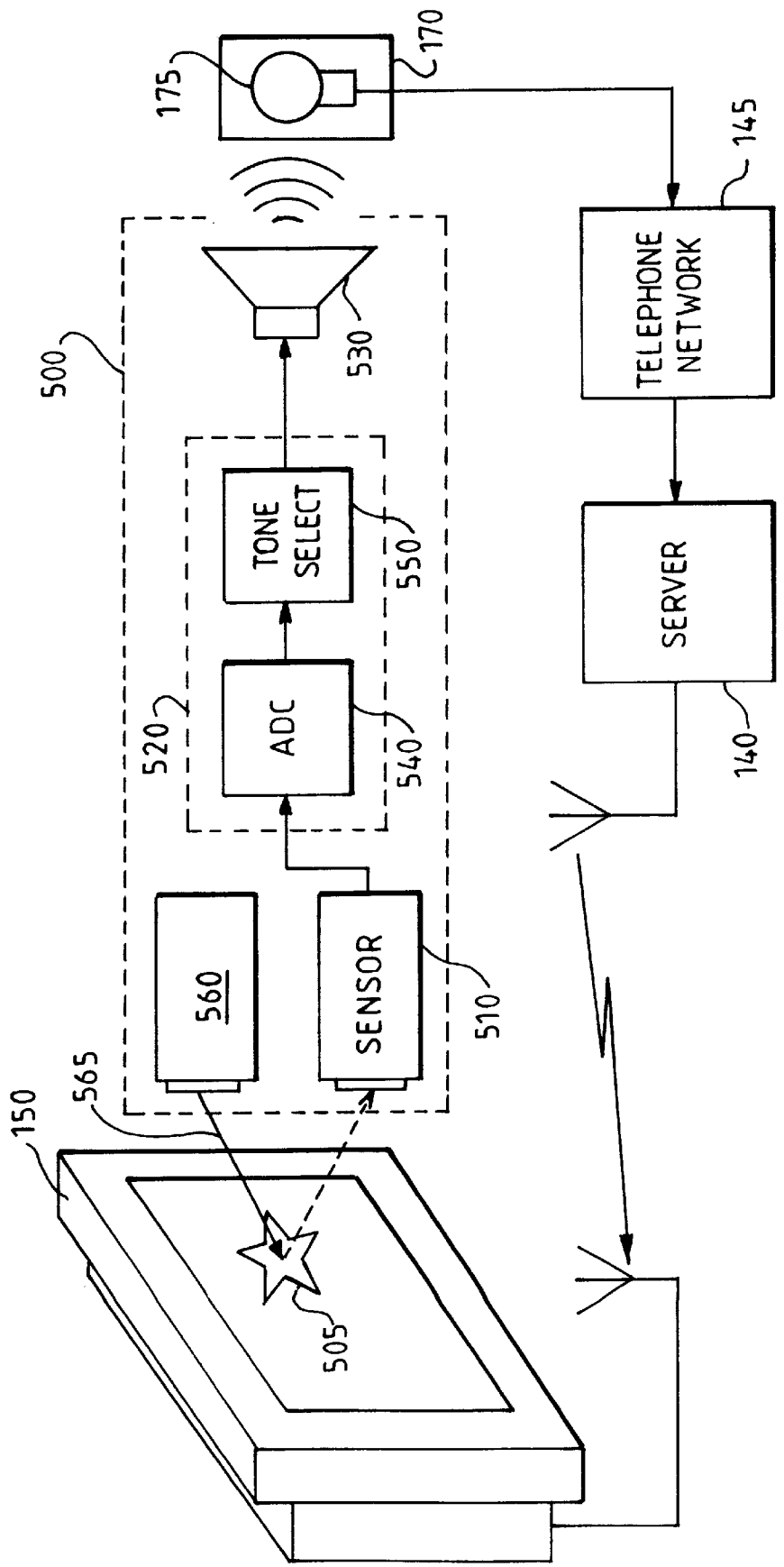
FIG. 4 is a block diagram of a pointing device for controlling access to the data communication network; and, FIG. 5 is another block diagram of the teletext server presented in the form of a flow chart.

Referring now to FIG. 4, an example of a pointing device 500 embodying the present invention comprises a light source 560 for generating a light beam 565 to produce a light spot on the screen of television receiver 150. The light spot enable the user to aim the pointing device at an icon 505 displayed on the screen of television receiver 150. Light source 560 may comprise, for example a low power laser. Pointing device 500 further comprises a sensor 510 for generating an output on detection of icon 505. The output of sensor 510 is connected to the input of a tone generator 520. The output of tone generator 520 is connected to a loudspeaker 530. In operation, sensor 510 generates an electrical signal representative of one or more attributes, such as shape and colour of the icon at which pointing device is generated. In a particularly preferred embodiment of the present invention which serves as the basis of the following description, sensor 510 comprises a shape sensitive transducer such a charge coupled (CCD) device for generating an electrical output signal representative of the shape of the icon 505 at which pointing device 500 is directed. Tone generator generates an AC electrical signal of a frequency determined by the output from sensor 510. It will appreciated from FIG. 4 that tone generator 520 may for example comprise an analog to digital convertor (ADC) 540 for digitising the output from sensor 510 and a tone selector 550 for selecting the output signal frequency in accordance with the digitised sensor output. Loudspeaker 530 generates an audio tone in response to the AC signal output from tone generator 550. The audio tone produced by speaker 530 of pointing device 500 is detected by a microphone 175 of telephone 170 and sent to server 140 via the telephone network 145. In some embodiments of the present invention, for use in conjunction with hands-free telephone equipment for example, pointing device may be provided in a single hand-held unit. However, in other embodiments of the present invention, pointing device 500 may be divided into two or more separate units with sensor 510 and light source 540 located in a hand-held portion and speaker 530 located in a portion for attachment to, or positioning within the range of sensitivity of, a telephone hand-set.

Figure 5:
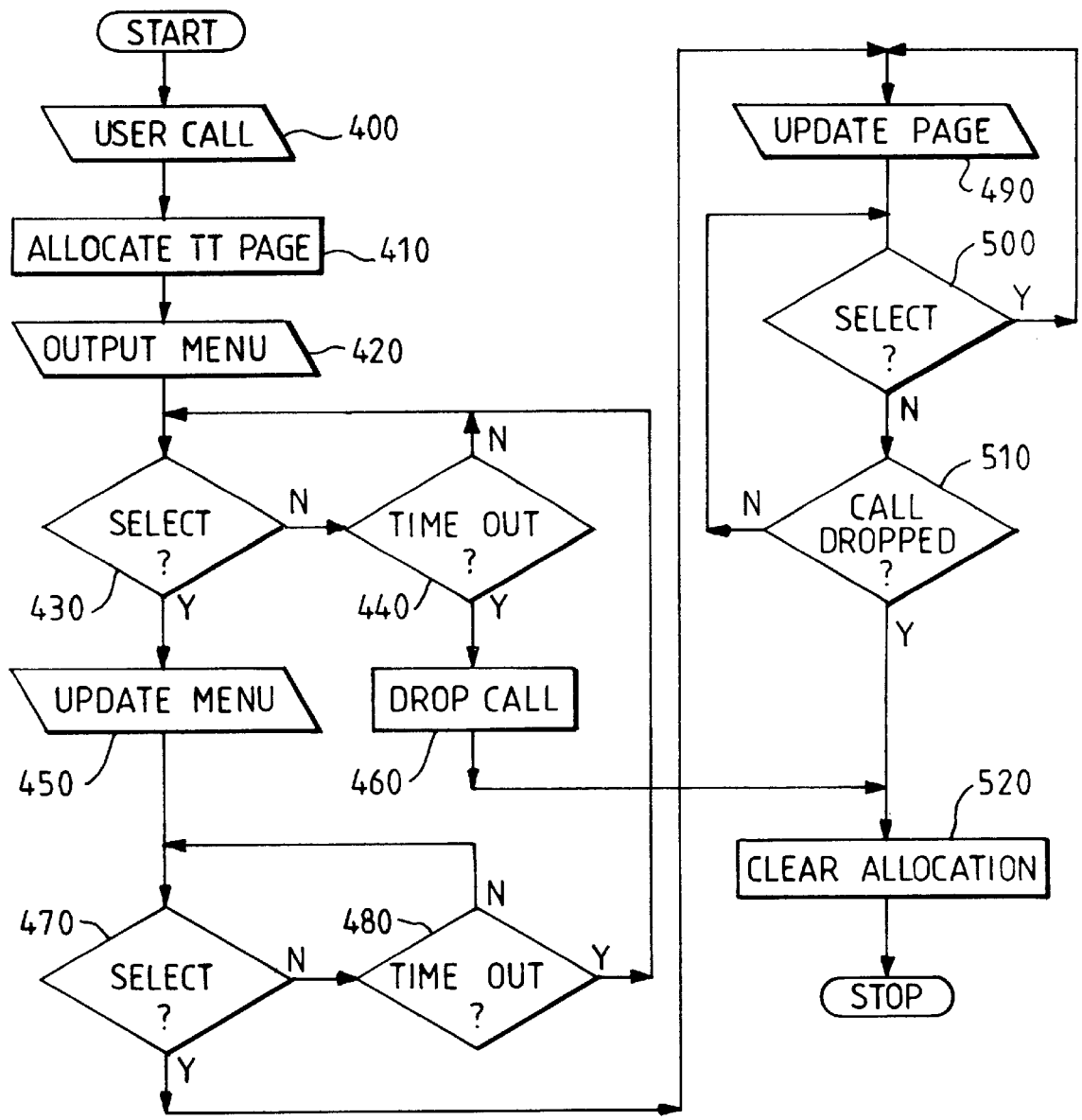

Referring now to FIG. 5, to display information from a WWW page on television receiver 150, user 180 places a telephone call from telephone 170 to a telephone number associated with call handler 300 of teletext server 140 as signified by input block 400. At block 410, call handler 300 responds to the incoming call by allocating a currently unused teletext page to the user. Call handler 300 automatically generates an audio message for indicating the number of the allocated teletext page to the user.

Web browser 310 provides an initial subject menu to page convertor 310. At block 420, page convertor 320 inserts the initial subject menu into the allocated teletext page. The teletext page including the menu is inserted in the broadcast television signal. The teletext page is recovered from broadcast television signal at television receiver 150, and the subject menu is displayed on the screen of television receiver 150. User 180 accesses the allocated teletext page and hence the subject menu by keying the number supplied via telephone 170 on remote control device 160. Television receiver displays the allocated teletext page in response to the corresponding output of remote control device 160. Each item on the subject menu is associated with a different shaped icon 505.

User 180 selects, at block 430, a particular item from the subject menu by directing pointing device 500 towards the corresponding icon 505 and enabling pointing device to generate the corresponding audio tone, by depressing an enable button of pointing device 500 for example. The corresponding audio tone is detected by microphone 175 of telephone 170. Call handler 300 detects the audio tone received by telephone 170; identifies the icon signified by the audio tone; and passes the icon identified to web browser 310. At block 450, a search engine of web browser 310 scans internet 100 for WW pages corresponding to the subject selected by the user. Web browser 310 then generates a WWW menu of WWW pages identified by the search engine. Each WWW page listed in the WWW menu is accompanied by a brief description of the content thereof, and each WWW page listed in the WWW menu is, once again associated with a different shaped icon. Web browser 310 compiles a look up table mapping each icon to the URL of the corresponding WWW page. The WWW menu is passed by web browser 310 to page convertor 320 for inclusion in the teletext page allocated to user 180.

If user 180 fails to make a selection from the initial menu during a predetermined time out period monitored at block 440 then, at block 460, the telephone call connection between telephone 170 and call handler 300 is terminated by call handler 300. At block 520, call handler 300 releases the allocated teletext page for re-allocation to a new user. If however selection from the initial menu is made as hereinbefore described, user 180 is presented with the WWW menu on the screen of television receiver 150. At block 470, user selects a WWW page of interest from WWW menu by directed pointing device 500 at the corresponding icon so that pointing device generates the corresponding audio tone which, in turn, is detected by telephone 170 and returned to server 140. Call handler 300 detects the audio tone, recovers the corresponding icon, and sends the recovered icon to web browser 310. Web browser 310 then retrieves the URL corresponding to the icon from the look up table and the WWW page corresponding to the URL from Internet 100. The retrieved www page is sent by web browser 310 to page convertor 320. At block 490, page convertor 320 converts the WWW page supplied by web browser to a form suitable for inclusion in the allocated teletext page and updates the allocates the teletext page to include the converted WWW page for presentation to user 180 on the screen of television receiver 150.

If user 180 fails to select a WwW page within a predetermined time out period then, at block 480, user 180 is returned to the initial menu for subject selection at block 430.

Each hypertext link contained in the retrieved WWW page, if any, is converted by page convertor 320 into an icon for inclusion in the allocated teletext page. Page convertor 320 instructs web browser to update the look-up table to include the icon corresponding to each hypertext link. At block 500, user 180 can select the hypertext link by directing pointing device at the corresponding icon so that the corresponding audio tone is detected by telephone 170. The audio tone is detected by call handler 300 and the corresponding icon is determined and sent to web browser 310. In turn, web browser 310 retrieves the URL corresponding to the icon from the look-up table and retrieves the corresponding linked WWW page from Internet 100. The linked WWW page retrieved by web browser 310 is converted to teletext format by page convertor 320 and included in the allocated teletext page for display to user 180.

At block 510, user 180 can terminate the Internet session simply by terminating the call set up between telephone 170 and call handler 300. As mentioned earlier, on detection of termination of the call, at block 520 call handler releases the allocated teletext page for re-allocation to a new user.

In the embodiment of the present invention hereinbefore described two tiers of menus are provided, with possible selections reverting to those of the initial menu in the event that no selection is made from the WWW menu within a predetermined time interval. It will however appreciated that, in other embodiments of the present invention, more than two tiers of menus may be provided with possible selections reverting to those of earlier menus in the event of no selection within a predetermined period. Equally, in some embodiments of the present invention, only a single menu of available WKW pages may provided.

In a modification of the embodiment of the present invention hereinbefore described, call handler 300 may include a facsimile sub-system for providing a user having access to a facsimile receiver with a printed output of a selected WWW page.

In another modification of the embodiment of the present invention hereinbefore described, call handler 300 may include a "call-back on busy" sub-system for returning a call to telephone 170 when a teletext page is free for allocation in the event of an initial call from telephone 170 being made at a time when all teletext pages available to server 140 are already allocated to other users.

In particularly preferred embodiments of the present invention, at least one of the teletext pages available to server 130 is reserved by call handler 300 for providing on-screen help to user 180.

In the preferred embodiments of the present invention hereinbefore described, sensor 510 of pointing device 500 generates an output signal representative of the shape of the icon to which pointing device 500 is directed. It will be appreciated that, in other embodiments of the present invention sensor 510 may be sensitive to one or more different attributes of an icon. Such sensors may be based on one or more of a plurality of different types of transducer. Selection of transducer or combination of transducers is dependent on the attribute or combination of attributes of icon 510 to which sensor 510 is to be made sensitive. For example, in some preferred embodiments of the present invention, sensor 510 may comprise a wavelength sensitive transducer for generating an output signal dependent on the colour of the icon.

Although preferred embodiments of the present invention have been hereinbefore described with reference to a system for providing internet access via a domestic television receiver, it will be appreciated that the present invention is not limited to such an application and may equally be employed to provide pointing device capability in other remote computing applications.

In the preferred embodiments of the present invention hereinbefore described, pointing device 500 is provided with a light source 560 for generating a targeting spot on the television screen. It will be appreciated that, in other embodiments of the present invention, light source 560 may be omitted. For example, in another embodiments of the present invention, the portion of pointing device 500 carrying sensor 510 may be adapted for positioning against the screen of television receiver 150 to adjacent the displayed corresponding to the desired option.

What is claimed is:

1. A remote pointing device comprising:
    a light source in said remote pointing device for generating a targeting spot on a display screen, said light source enabling a user to aim said pointing device at an icon displayed on said display screen;
    a sensor in said remote pointing device for directing towards said icon displayed on said display screen, the sensor generating a sense signal indicative of an attribute of the icon using a shape sensitive transducer; and an audio generator in said remote pointing device for generating an AC electrical signal, in dependence on the sense signal, an audio signal for subsequent detection by the microphone of a telephone separate from said pointing device.

2. A remote pointing device as in claim 1, wherein the sensor generates the sense signal as a function of the shape of the icon wherein said shape sensitive transducer is a charge coupled device.

3. A remote pointing device as in claim 1, wherein the sensor generates the sense signal as a function of the colour of the icon wherein said shape sensitive transducer is a charge coupled device.

4. A remote pointing device as in claim 1, comprising said light source having a low power laser in said remote pointing device for generating a light beam to produce said targeting spot on the display screen to assist aiming of the remote pointing device.

5. A system for remote selection of one or more options in a data processing apparatus the system comprising: means for receiving a call from a telephone hand-set; means for allocating a teletext page in a broadcast television signal in response to the call from said telephone hand-set; means for associating each option with an icon; means for writing each icon to the allocated teletext page; means for associating each icon with an audio signal from a remote pointing device wherein said remote pointing device contains a light source for generating a targeting spot on a display screen for aiming said pointing device at said icon; and, means for activating each option on receipt of the corresponding audio signal from the telephone hand-set separate from said remote pointing device.

6. A system as claimed in claim 5, comprising means for sending a message identifying the allocated teletext page to the telephone.

7. A system as claimed in claim 5, wherein the data processing apparatus comprises a computer network, the system comprising means for generating a menu of data files available via the computer network, each data file having a different icon specified in the menu, means for writing the menu to the allocated teletext page; means for receiving the audio signal corresponding to a selected icon from the telephone; and means for writing data from the data file corresponding to the selected icon to the allocated teletext page.

8. A system as claimed in claimed in claim 7, comprising means for generating successive menus of data files in response to successive selections received via the telephone.

9. A system as claimed in claim 5, comprising means for releasing the allocated teletext page for re-allocation in response to termination of the telephone call.

10. A system as claimed in claim 5, comprising means for detecting if a teletext page is available for allocation to an incoming call and, in the event that no teletext pages are available for allocation, for returning the incoming call when a teletext page is released for re-allocation.

11. A method for selecting an icon on a display screen, comprising: a light source in a remote pointing device for generating a targeting spot on said display screen, said light source enabling a user to aim said pointing device at the icon displayed on said display screen; generating, via a sensor in said remote pointing device directed towards the icon, a sense signal indicative of an attribute of the icon using a shape sensitive transducer; and generating an AC electrical signal, in dependence on the sense signal, in said remote pointing device an audio signal for subsequent detection by the microphone of a separate telephone.

* * * * *